United States Patent
McConaghy et al.

(10) Patent No.: US 8,006,220 B2
(45) Date of Patent: Aug. 23, 2011

(54) MODEL-BUILDING OPTIMIZATION

(75) Inventors: Trent Lorne McConaghy, Beatty (CA);
Kristopher Breen, Saskatoon (CA);
Shawn Rusaw, Saskatoon (CA); David Callele, Saskatoon (CA)

(73) Assignee: Solido Design Automation Inc., Saskatoon, Sakatchewan (CA)

( * ) Notice: Subject to any disclaimer, the term of this patent is extended or adjusted under 35 U.S.C. 154(b) by 477 days.

(21) Appl. No.: 12/237,069

(22) Filed: Sep. 24, 2008

(65) Prior Publication Data

US 2009/0083680 A1    Mar. 26, 2009

Related U.S. Application Data

(60) Provisional application No. 60/974,614, filed on Sep. 24, 2007.

(51) Int. Cl.
*G06F 17/50* (2006.01)
(52) U.S. Cl. ......... 716/132; 716/100; 716/103; 716/106
(58) Field of Classification Search .................. 716/100, 716/106, 132, 103
See application file for complete search history.

(56) References Cited

U.S. PATENT DOCUMENTS

2008/0234979 A1* 9/2008 Costiner et al. ............. 702/184
2009/0228846 A1* 9/2009 McConaghy et al. ........... 716/4

OTHER PUBLICATIONS

Jones et al., "Efficient Global Optimization", J. Global Optimization, vol. 13, 1998, pp. 455-592.
Knowles, "ParEGO: a hybrid algorithm with on-line landscape approximation for expensive multiobjective optimization problems", IEEE Transactions on Evolutionary Computation, vol. 10, No. 1, Feb. 2005, pp. 50-66.
Deb et al., "A fast and elitist multi-objective genetic algorithm: NSGA-II". IEEE Transaction on Evolutionary Computation, 6(2), 2002, 181-197.

* cited by examiner

*Primary Examiner* — Sun Lin
(74) *Attorney, Agent, or Firm* — Louis B. Allard; Borden Ladner Gervais LLP

(57) ABSTRACT

A method and system for performing multi-objective optimization of a multi-parameter design having several variables and performance metrics. The optimization objectives include the performance values of surrogate models of the performance metrics and the uncertainty in the surrogate models. The uncertainty is always maximized while the performance metrics can be maximized or minimized in accordance with the definitions of the respective performance metrics. Alternatively, one of the optimization objectives can be the value of a user-defined cost function of the multi-parameter design, the cost function depending from the performance metrics and/or the variables. In this case, the other objective is the uncertainty of the cost function, which is maximized. The multi-parameter designs include electrical circuit designs such as analog, mixed-signal, and custom digital circuits.

48 Claims, 10 Drawing Sheets

MODEL-BUILDING OPTIMIZATION

CROSS REFERENCE TO RELATED APPLICATION

This application claims the benefit of priority of U.S. Provisional Patent Application No. 60/974,614 filed Sep. 24, 2007, which is incorporated herein by reference.

The applicant acknowledges the participation of K.U. Leuven Research and Development in the development of this invention.

FIELD OF THE INVENTION

The present invention relates generally to multi-objective optimization techniques of multi-parameter designs. In particular, the present invention related to multi-objective optimization of electric circuit designs such as analog, mixed-signal and custom digital electrical circuit designs.

BACKGROUND OF THE INVENTION

Designers of electrical circuits routinely face the task of optimizing performance of analog, mixed-signal and custom digital circuits, hereinafter referred to generally as electrical circuit designs (ECDs). In optimizing such ECDs, the designers aim to set device sizes on the ECUs such as to obtain optimum performances for one or more performance metric of the ECDs. In design-for-yield optimization, the designers aim to set the device sizes such that the maximum possible percentage of manufactured chips meets all performance specifications.

In general, a given ECD will have multiples goals in the form of a plurality of constraints and objectives. A simplifying assumption that can sometimes be made to optimize such ECDs is to assume that a measure of the quality of a given ECD can be reduced to a single cost function, which generally depends on the design variables and performance metrics of the ECD, and which can optimized by any suitable method. To arrive at a value of the cost function for a given design point usually requires multiple circuit simulations of the ECD.

One way for designers to choose circuit device sizes to minimize the related cost function is to use a software-based optimization tool 20 shown at FIG. 1. The optimization tool 20 includes a problem setup module 22 that includes particulars of the ECD to be optimized. The problem setup module 22 is connected to an optimizer (not shown), and is also connected to a simulation module 26. The particulars of the ECD can include a netlist of the ECD, performance metrics, design variables, process variables and environmental variables of the ECD. The problem setup module 22 also defines the steps to be followed to measure the performance metrics as a function of the ECD's several variables. The problem setup module 22 is in fact where the problem to be studied by the system 20 is setup.

The performance metrics can be a function of these various variables. The design variables can include, e.g., widths and lengths of devices of the ECD. The process variables can be related to random variations in the ECD manufacturing. The environmental variables can include, e.g., temperature, load conditions and power supply. The problem setup module 22 can also include further information about design variables, such as minimum and maximum values; additional environmental variables, such as a set of environmental points to be used as "corners" with which to simulate the ECD; and random variables, which can be in the form of a probability density function from which random sample values can be drawn.

As will be understood by the skilled worker, the procedure to be followed to measure the performance metrics can be in the form of circuit testbenches that are combined with the netlist to form an ultimate netlist. The ultimate netlist can be simulated by a simulation module 26, which is in communication with the problem setup module 22. The simulation module 26 can include, for example, one or more circuit simulators such as, for example, SPICE simulators. The simulation module 26 calculates waveforms for a plurality of candidate designs of the ECD. The waveforms are then processed to determine characteristic values of the ECD. As will be understood by the skilled worker, the plurality of candidate designs is a series of ECDs differing slightly from each other in the value of one or more of their variables.

The problem setup, as defined by the problem setup module 22, is acquired by the simulation module 26, which uses one or more simulators to simulate data for multiple candidate designs of the ECD. The simulation data is stored in a database 28 from where it can be accessed by a processor module 30, which can include, for example, a sampler or a characterizer. The processor module 30 is also in communication with the problem setup module 22. Given the problem setup, the sampler and/or characterizer can perform "sampling" and/or "characterization" respectively, of the ECD in question, by processing the simulation data, to produce characteristic data of the ECD. Based on this characteristic data, the processor module 30 can calculate one or more characteristic values of the ECD. During the course of a sampling or characterization, the database 28 can be populated with the characteristic data provided by the processor module 30 and with the one or more characteristic values of the ECD.

One of the characteristic values is that of the single cost function for a given ECD simulation. Other characteristic values can include, for example, a yield estimate for a given design point, histograms for each performance metric, 2D and 3D scatter plots with variables that include performance metrics, design variables, environmental variables, and process variables. A characteristic value can also represent, amongst others, the relative impact of design variables on yield, the relative impact of design variables on a given performance metric, the relative impact of all design variables vs. all process variables vs. all environmental variables, tradeoffs of yield vs. performances, and yield value for a sweep of a design variable.

The system 20 also includes a display module 32 and a user input module 34 that are used by the designer to set up the optimization problem, invoke an optimization run, and monitor progress and results that get reported back via the database 28. The processor module 30 selects the ECD's candidate designs that have the lowest single cost function values and displays these to the designer within finite time (e.g., overnight) and computer resource constraints (e.g., 5 CPUs available).

Optimization is a challenge due to the nature of the particular design problem. The time taken to compute/simulate/measure the value of the single cost function of a single ECD candidate design can take minutes or more. Therefore only a limited number of candidate designs can actually be examined given the resources at hand. The single cost function is usually a blackbox, which means that it is possibly non-convex, non-differentiable and possibly non-continuous. Consequently, this precludes the use of optimization algorithms that might take advantage of those properties. That is, it is not possible to use algorithms that exploit many simplifying assumptions.

Similar optimization problems exist in many fields other than electric circuit design. In fact, they exist in almost all engineering fields that have parameterizable design problems where simplifying assumptions cannot be made and that have means of estimating a design's cost functions such as with, e.g., a dynamical systems simulator. Such fields include, for example, automotive design, airfoil design, chemical process design and robotics design. As will be understood by the skilled worker, computing a cost function at a given design point, in generally any technical field, can actually include physical processes, such as running a physical robot or automatically performing laboratory experiments according to design points and measuring the results.

As is known in the art, a locally optimal design is one that has lower cost than all its immediate neighbors in design space, whereas a globally optimal design is one for which no other design in the whole design space has a lower cost function. As such, a blackbox optimization problem can be further classified into global or local optimization, depending on whether a globally optimal solution is desired (or at least targeted) or, a locally optimal solution is sufficient. As is also known, a convex mapping is one in which there is only one locally optimal design in the whole design space, and therefore it is also the globally optimal design. A nonconvex mapping means that there is more than one locally optimal design in the design space. Over the years, multiple global blackbox search algorithms have been developed, such as, for example, simulated annealing, evolutionary algorithms, tabu search, branch & bound, iterated local search and particle swarm optimization. Local search algorithms are also numerous and include, for example, Newton-method derivatives, gradient descent and derivative-free pattern search methods.

The challenge in designing optimization algorithms for such problems is to make the most use out of every cost function evaluation that has been made as the optimization progresses through its iterations. One type of optimization algorithms that does this are model-building optimization (MBO) algorithms. An MBO algorithm typically builds models based on candidate designs, also referred to as design points, and on their respective cost function values as they become available at various iterations of the optimization algorithm. That is, MBO algorithms use the set of of {design point, cost} tuples—and use regression-style modeling approaches to help choose the next candidate point(s).

A very notable MBO with a single overall cost function is the Efficient Global Optimization (EGO) algorithm: D. Jones, M. Schonleau, and W. Welch, "Efficient Global Optimization", J. Global Optimization, vol. 13, pp. 455-592, 1998. More recently, variants with multiple cost functions have emerged too, e.g. J. Knowles, "ParEGO: a hybrid algorithm with on-line landscape approximation for expensive multiobjective optimization problems, IEEE Transactions on Evolutionary Computation, No. 1, February 2006, pp. 50-66.

An example of a pseudocode for a single cost function MBO algorithm can be written as:
 (1) Generate initial set of sample vectors $X=\{x_1, x_2, \ldots\}$
 (2) Measure scalar cost $y_i$ for each vector $x_i$, e.g. by simulation, to get $y=\{y_1, y_2, \ldots\}$
 (3) Build a surrogate model using the $X \Rightarrow y$ training data, which will be used as the surrogate cost function for candidate x's in the subsequent step
 (4) Via an inner optimization, choose a new sample point $x_{new}$ by optimizing across X according to an infill criterion
 (5) Measure $y_{new}$=cost of $x_{new}$
 (6) Add $x_{new}$ to X, and $y_{new}$ to y
 (7) If termination criteria is hit, stop; else go to (3)

The pseudocode of the above algorithm is represented graphically at FIG. 2 where reference numerals 40, 42, 44, 46, 48, 50 and 52 identify steps (1) through (7), respectively, of the above pseudocode.

Step (4), shown at reference numeral 46 is the core of the algorithm and must be such that repeated iterations will make the search converge towards a globally optimal solution and, ideally, on the steps made towards attaining the optimal solution, will make continual improvements in the cost function. This can be challenging. If step (4)'s inner optimizer were to blindly minimize the surrogate cost function, it would zero in on the model's perceived-good regions, and ignore other regions that are "blind" to the current model but could be potentially far better. Accordingly, there must be some balance of exploration (learning more about unknown regions) and exploitation (taking further advantage of known good regions). Uncertainty is a formal way for the model to discern blind spots vs regions that are well-understood by the model. An infill criterion is a function that balances exploration vs. exploitation i.e., that balances surrogate's uncertainty with surrogate's estimate of cost.

FIG. 3 illustrates the behavior of the algorithm shown at FIG. 2 for a one variable design, the variable being X. FIG. 3 shows the candidate design cost for ten candidate designs as a function of X. These candidate designs 61, also referred to as training data, are shown as diamonds. In this example, the algorithm of FIG. 2 aims to maximize the cost as a function of X. FIG. 3 illustrates the state of an optimization after proceeding through the above steps (1)-(4) the first time. At step (1), the algorithm generated 10 sample vectors in x-space. At step (2), it measured the true scalar cost for each vector. The {x value, cost function} tuples are illustrated by the diamonds. These form the training data for the surrogate regression model. At step (3), a surrogate model is built, which is represented by the line 6 which goes through all the training points, having just some curvature near the middle X region. At step (4), a new value of x must be chosen which maximizes the infill criterion, which combines the model's estimate of the cost function and the estimate of uncertainty (to maximize). The plot 62 that looks like a mix of large and small pyramids with edges at the training data 61 illustrates the infill criterion, which, in this case, is a weighted sum of the cost function and uncertainty. Uncertainty for this example is taken as being the scaled distance to the nearest training point. Therefore, at X values which have a training point, there is an uncertainty of zero and the infill criterion value is equal to the objective function value. As the X values go away from the training samples the value of uncertainty goes progressively higher. Step (4)'s inner optimization maximizes the infill criterion, and finds the corresponding value "X_guess" of about 1.5.

FIG. 4 shows the next phase of the search, covering steps (5)-(7) and the next round of steps (3)-(4). At step (5), the true scalar cost for X_guess is measured, to get $y_{xguess}$. At step (6), the new xguess and $y_{xguess}$ are added to the existing $X \Rightarrow y$ training data. It is to be noted that the single new diamond point 63 is shown at FIG. 4. At step (7), assuming that no stopping criteria has been hit the algorithm is looped back to step (3) which constructs a new candidate design it is to be noted that the surrogate model of cost 64 at FIG. 4 is substantially different from the model 60 at FIG. 3, particularly around x=1.5. Initially, the surrogate model 60 went gradually from about y=0.0 to y=0.4 as x goes from 0 to 3.5, now, at about x=1.5, the model 64 goes to y=0.6 during its transition from y=0.0 to y=0.4. The model 60, as shown at FIG. 4, reflects the true underlying data more accurately at x=1.5, whereas the model 60, as shown at FIG. 3, effectively had a "blind spot" at x=1.5. The MBO algorithm was able to simulate at about x=1.5 to uncover the truth behind at this blind spot. Had it ignored uncertainty and only went for the estimate of the cost, the algorithm would have made an X_guess somewhere in x>2 where cost is maximized, and would have never found the improved designs in the region about x=1.5. To summarize this example of a prior art optimization approach, we see that the new infill function has 0 uncertainty at x=1.5, and now the most optimal point for the new X_guess is at a different region of x, near x=2.5.

Generally, an MBO algorithm requires choices of: (a) a surrogate model which can output uncertainty, (b) an "infill criterion" which robustly balances exploitation vs. exploration, and (c) an inner optimization algorithm. The difficulty in making these choices is examined below.

The first choice that must be made at step (4) above is the choice of a regressor. As noted, the regressor, also referred to as a regression model, must be able to output cost and uncertainty in cost. To meet these constraints, the EGO algorithm referred to above uses a Gaussian process model, which is also known as a kriging model or a DACE (Design Automation of Computer Experiments) model. There are other options for choice of regression models, but they must all have some means of providing the uncertainty of their estimate. Alternatively, one can use a means independent of the model, such as making uncertainty proportional to the distance to the closest point (which has its own disadvantages, such as blindness to the curvature of a mapping for a given region). The regressor must also possess other properties to make it effective. Such properties include that the regressor should be able to handle a small (e.g., 10) or large (e.g., 10,000) number of training samples; handle any given number of input dimensions which is the number of design variables and which can be equal to any number (e.g., 1 or 10 or 100 or 1000 or even more); capture nonlinearities such as discontinuities and nonconvex mappings; be reliable enough to be within an automated loop; be built fast enough to be within the loop; and be simulated fast enough to be within the loop. Meeting all these criteria plus supplying an uncertainty estimate can be a big challenge for regressors. Most notably, the Gaussian process model in the EGO approach is known to have very poor scaling properties, doing poorly for more than 10 or 15 input dimensions and for more than about 100 training samples.

The second choice that must be made at step (4) above is that of the infill criterion, which is a function to balance the measures of uncertainty (exploration) with surrogate cost function (exploitation) into a single inner optimization cost function. The EGO algorithm maximizes "expected improvement in cost function." Other options in the literature have been proposed. One such notable option is to minimize "least constrained bounds" (LCB) which is essentially a weighted sum of cost and negative uncertainty, that is: minimize $[w_{cost}*\text{surrogate\_cost}(x)-w_{uncertainty}*\text{uncertainty}(x)]$, where $W_{cost}$ and $W_{uncertainty}$ are the weights attributed to the surrogate cost and the uncertainty respectively.

The third choice that must be made at step (4) above is choice of inner optimization algorithm, i.e., the algorithm which traverses the space of possible X's to maximize/minimize the infill criterion. The algorithm will typically aim to be as global as possible, and will have access to a large number of "surrogate cost function evaluations". However, since such evaluations each take non-negligible computer time, the algorithm choice makes a difference in that it only has a limited number of evaluations to get the best-possible solution. The EGO algorithm itself uses branch-and-bound for an exact guess, but that can get very expensive with a larger number of dimensions. Other algorithm choices can include, for example, iterated local search, evolutionary algorithms and tabu search.

Compared to many other algorithms, MBO algorithms, such as the EGO algorithm, have been demonstrated to be highly efficient in optimization of certain classes of problems. The class of problems in which it excels has lower dimensionality (e.g., 1-10 variables in X space), and are smoother such that the Gaussian process model fits it better.

The termination criteria of step (7) above for the algorithm are flexible. They can include such criteria as: stop if number of designs explored is greater than a pre-determined threshold; stop if overall runtime is greater than a pre-determined maximum runtime; stop if best improvement over last few designs is below a pre-determined improvement threshold; stop if the maximum uncertainty in the whole design space is less than a pre-determined uncertainty threshold; and so on.

MBO algorithms have another limit in that the number of surrogate cost evaluations at step (4) is constrained. While the computational cost of evaluating surrogate cost is much cheaper than true cost, it is certainly not free. This means that computational cost of step (4) can be quite large, because there are potentially many evaluations of surrogate cost. Furthermore, the model itself takes time to build at step (3). A reasonable rule of thumb is to keep the time for steps (3) and (4) roughly less than or equal to the time for a true cost evaluation. In other words, the order of magnitude of time to build model plus the inner optimization time must be less than or equal to time to compute/measure the true cost. Since it's in orders of magnitude, it also means that inner optimization time must be less than or equal to time to compute/measure true cost. By reasonably assuming that the dominant component of inner optimization time is the evaluation of surrogate cost and that the time for evaluation of surrogate uncertainty comes for free when we evaluate surrogate cost, the inner optimization time is given by (number of inner designs) * (time to evaluate surrogate cost). Therefore, (number of inner designs allowed)=(time to compute true cost)/(time to evaluate surrogate cost). That ratio is how much faster the surrogate cost function is compared to the true cost function. It's typically on the order of 100 to 100,000, which means that the inner optimization algorithm can evaluate 100 to 100,000 design candidates.

The convergence rate and results returned by MBO algorithms are highly sensitive to the choice of infill criterion, both directly and indirectly. Directly, because some correlate better than others for getting to a global optima. Indirectly, because they cause the structure of the cost function to be vastly different, affecting the searchability of the function, which is critical when there is a limited budget of 100 to 100,000 design candidates. For example, the EGO algorithm use of "expected improvement" turns out to have large, vast plateaus in the space, punctuated by tall spikes. Much search effort can be expended wandering through the plateaus until a tall spike is found, and as soon as any spike is found, the inner optimizer may end up quickly diverting all its search effort to that, ignoring other possibly far higher tall spikes. This effect gets even worse with higher dimensionality. The LCB infill criterion has a weighted sum of cost and uncertainty, but that means that both cost and uncertainty must be scaled to be in approximately the same range, which can sometimes be a challenge. Even if that is solved, a larger challenge is how to choose the weight for cost vs. uncertainty, because that involves making an exact choice for how much exploration is desired vs. how much exploitation.

The current EGO algorithm and other MBO variants have not been demonstrated on more than about 15 design variables, because they cannot effectively choose the next design point(s) without having overwhelming computational effort compared to effort for estimating true cost. This is a giant disadvantage for applicability of such algorithms to larger problems, which may have 25, 50, 100 or even 1000 design variables; such problems are common in electrical circuit design and in other fields. Specific issues that cause this disadvantage include the inner optimization's need to balance exploration with exploitation with respect to an infill criterion; the inner optimization algorithm's need to be efficient enough to explore and get reasonable results in a limited number of samples; and the regression's need to meet scalability and speed goals yet still provide an estimate of uncertainty.

Therefore, it is desirable to provide method and system for multi-parameter design optimization that can effectively handle a large number of design variables.

SUMMARY OF THE INVENTION

It is an object of the present invention to obviate or mitigate at least one disadvantage of previous model-building optimization algorithms, such that they can be applied to a broader range of optimization problems, including analog, mixed-signal or custom digital circuit design problems.

In a first aspect of the invention, there is provided a method to optimize a multi-parameter design (MPD) having variables and performance metrics, each performance metric being a function of at least one of the variables. The method comprises steps of (a) generating a first set of candidate designs of the MPD; (b) calculating a value of each performance metric for each candidate design of the first set, each calculated value having an uncertainty associated therewith; (c) building a surrogate model of each performance metric to obtain a set of surrogate models, each surrogate model mapping at least one variable to a respective output value and to an uncertainty of the respective output value; (d) performing a multi-objective optimization on the set of surrogate models to obtain a second set of candidate designs containing non-dominated candidate designs of the MPD, the multi-objective optimization optimizing the surrogate model of each performance metric in accordance with pre-determined constraints, the multi-objective optimization also maximizing the uncertainty of the surrogate model of each performance metric; (e) calculating a value of each performance metric for each candidate design of the second set; (f) adding the second set to the first set to obtain an augmented set of candidate designs; (g) determining if the augmented set of candidate designs of the MPD meets pre-determined criteria; and (h) if the augmented set of candidate designs meets the pre-determined criteria, storing the augmented set of candidate designs in a computer-readable medium.

In a second aspect of the invention, there is provided a method to optimize a multi-parameter design (MPD) having variables and performance metrics, each performance metric being a function of at least one of the variables. The method comprises steps of: (a) building a cost function of the MPD, the cost function depending on the performance metrics; (b) generating a first set of candidate designs of the MPD; (c) calculating a value of each performance metric for each candidate design of the first set to obtain performance metric calculated values each having an uncertainty associated therewith; (d) in accordance with the performance metric calculated values, calculating a value of the cost function and an uncertainty of each value of the cost function for each candidate design; (e) in accordance with the calculated values of the cost functions and of their respective uncertainties, building a surrogate model of the cost function, the surrogate model mapping at least one variable to an output value of surrogate model of the cost function and to an uncertainty of the output value; (f) performing a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function; (g) calculating a value of each performance metric for each candidate design of the second set; (h) adding the second set to the first set to obtain an augmented set of candidate designs; (i) determining if the augmented set of candidate designs of the MPD meets pre-determined criteria; and (j) if the augmented set of candidate designs meets the pre-determined criteria, storing the augmented set of candidate designs in a computer-readable medium.

In a third aspect of the invention, there is provided system to optimize a multi-parameter design (MPD) having variables and performance metrics, each performance metric being a function of at least one of the variables. The system comprises a candidate design generation module to generate a first set of candidate designs of the MPD; a database in communication with the candidate design generation module, the database to store the first set of candidate designs of the MPD; and a processor module in communication with the database. The function of processor module is: (a) to extract the candidate designs from the database; (b) to calculate the performance metrics of each candidate design, each performance metric having an uncertainty associated therewith; (c) to build a surrogate model of each performance metric to obtain a set of surrogate models, each surrogate model mapping at least one variable to a respective output value and to an uncertainty of the respective output value; (d) to perform a multi-objective optimization on the set of surrogate models to obtain a second set of candidate designs containing non-dominated candidate designs of the MPD, the multi-objective optimization optimizing the surrogate model of each performance metric in accordance with pre-determined constraints the multi-objective optimization also maximizing the uncertainty of the surrogate model of each performance metric; (e) to calculate a value of each performance metric for each candidate design of the second set; (f) to add the second set to the first set to obtain an augmented set of candidate designs; and (g) to determine if the augmented set of candidate designs of the MPD meets pre-determined criteria. The system also comprises a computer readable medium in communication with the processor module, the computer readable medium to store the augmented set of candidate designs.

In a fourth aspect of the invention, there is provided a system to optimize a multi-parameter design (MPD) having variables and performance metrics, each performance metric being a function of at least one of the variables. The system comprises: a cost function generation module to generate a cost function of the MPD, the cost function depending on the performance metrics; a candidate design generation module to generate a first set of candidate designs of the MPD; a database in communication with the candidate design generation module and with the cost function generation module, the database to store the first set of candidate designs and to store the cost function; and a processor module in communication with the database. The function of the processor module is: (a) to extract the candidate designs from the database; (b) to calculate a value of each performance metric for each candidate design of the first set to obtain performance metric calculated values each having an uncertainty associated therewith; (c) in accordance with the performance metric calculated values, to calculate a value of the cost function and an uncertainty of each value of the cost function for each candidate design; (d) in accordance with the calculated values of the cost functions and of their respective uncertainties, to build a surrogate model of the cost function, the surrogate model mapping at least one variable to an output value of the surrogate model of the cost function and to an uncertainty of the output value; (d) to perform a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function; (e) to calculate a value of each performance metric for each candidate design of the second set; (f) to add the second set to the first set to obtain an augmented set of candidate designs; and (g) to determine if the augmented set of candidate designs of the MPD meets pre-determined criteria. The system further comprises a computer readable medium in communication with the processor module, the computer readable medium to store the augmented set of candidate designs.

In a fifth aspect of the invention, there is provided a computer readable medium having recorded thereon statements and instructions for execution by a computer to carry out a method to optimize a multi-parameter design (MPD). The method comprises steps of: (a) generating a first set of candidate designs of the MPD; (b) calculating a value of each performance metric for each candidate design of the first set, each calculated value having an uncertainty associated therewith; (c) building a surrogate model of each performance metric to obtain a set of surrogate models, each surrogate model mapping at least one variable to a respective output value and to an uncertainty of the respective output value; (d) performing a multi-objective optimization on the set of surrogate models to obtain a second set of candidate designs containing non-dominated candidate designs of the MPD, the multi-objective optimization optimizing the surrogate model of each performance metric in accordance with pre-determined constraints, the multi-objective optimization also maximizing the uncertainty of the surrogate model of each performance metric; (e) calculating a value of each performance metric for each candidate design of the second set; (f) adding the second set to the first set to obtain an augmented set of candidate designs; (g) determining if the augmented set of candidate designs of the MPD meets pre-determined criteria; and (h) while a termination criteria is not met, the termination criteria being at least one of the augmented set of candidate designs being substantially equal to a pre-determined set of target candidate designs, a maximum runtime of the method being reached, a maximum computational cost being reached, a minimum improvement requirement of the augmented set of candidate designs not being met between two successive iterations of steps (c) through (g), and a maximum number of iterations of steps (c) though (g) being reached: (A) substituting the candidate designs of the first set of candidate designs with the candidate designs of the augmented set of candidate designs; (B) deleting the second set of candidate designs; and (C) repeating steps (c) through (g).

In a sixth embodiment of the present invention there is provided a computer readable medium having recorded thereon statements and instructions for execution by a computer to carry out a method to optimize a multi-parameter design (MPD), the method comprising steps of: (a) building a cost function of the MPD, the cost function depending on the performance metrics; (b) generating a first set of candidate designs of the MPD; (c) calculating a value of each performance metric for each candidate design of the first set to obtain performance metric calculated values each having an uncertainty associated therewith; (d) in accordance with the performance metric calculated values, calculating a value of the cost function and an uncertainty of each value of the cost function for each candidate design; (e) in accordance with the calculated values of the cost functions and of their respective uncertainties, building a surrogate model of the cost function, the surrogate model mapping at least one variable to an output value of surrogate model of the cost function and to an uncertainty of the output value; (f) performing a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function; (g) calculating a value of each performance metric for each candidate design of the second set; (h) adding the second set to the first set to obtain an augmented set of candidate designs; (i) determining if the augmented set of candidate designs of the MPD meets pre-determined criteria; and (h) while a termination criteria is not met, the termination criteria being at least one of the augmented set of candidate designs being substantially equal to a pre-determined set of target candidate designs, a target cost of the cost function being met, a maximum runtime of the method being reached, a maximum computational cost being reached, a minimum improvement requirement of the augmented set of candidate designs not being met between two successive iterations of steps (e) through (i), and a maximum number of iterations of steps (e) though (j) being reached: (A) substituting the candidate designs of the first set of candidate designs with the candidate designs of the augmented set of candidate designs; (B) deleting the second set of candidate designs; and (C) repeating steps (e) through (i).

Other aspects and features of the present invention will become apparent to those ordinarily skilled in the art upon review of the following description of specific embodiments of the invention in conjunction with the accompanying FIGS.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for optimization of multi-parameter designs, e.g., electrical circuit designs, using model-building approaches. The present invention resolves exploration vs. exploitation issues via multi-objective inner optimization, or via stochastic choices of how to balance exploration vs. exploitation. The present invention resolves speed issues in model building and simulation by generating more than one candidate design point at once for a given model. The present invention resolves model building scalability issues via an ensemble-style framework in which nearly any regressor can be used rather than just regressors that directly output uncertainty.

Figure 1:
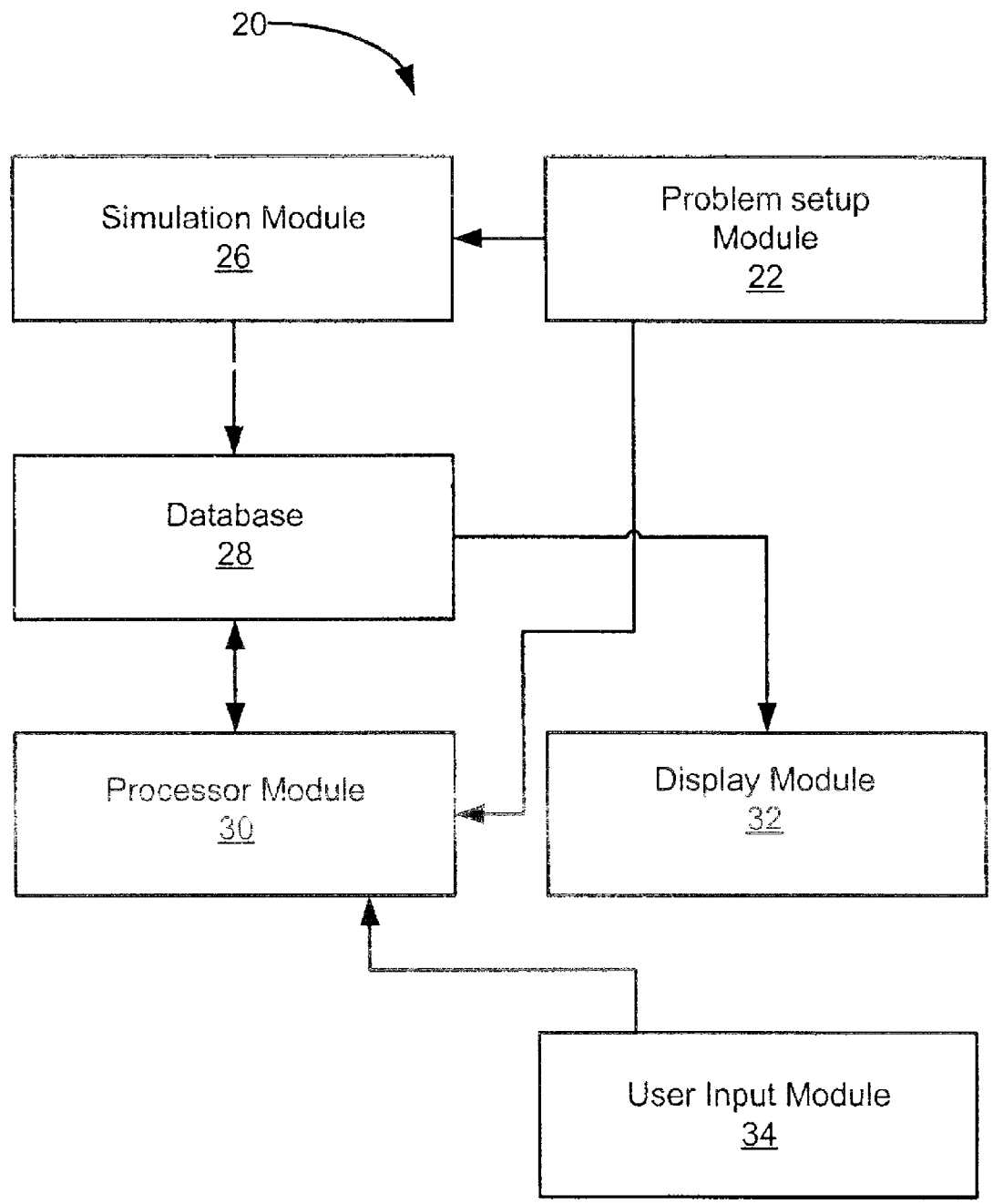
FIG. 1 shows a prior art system for optimizing electrical circuit designs.
Figure 2:
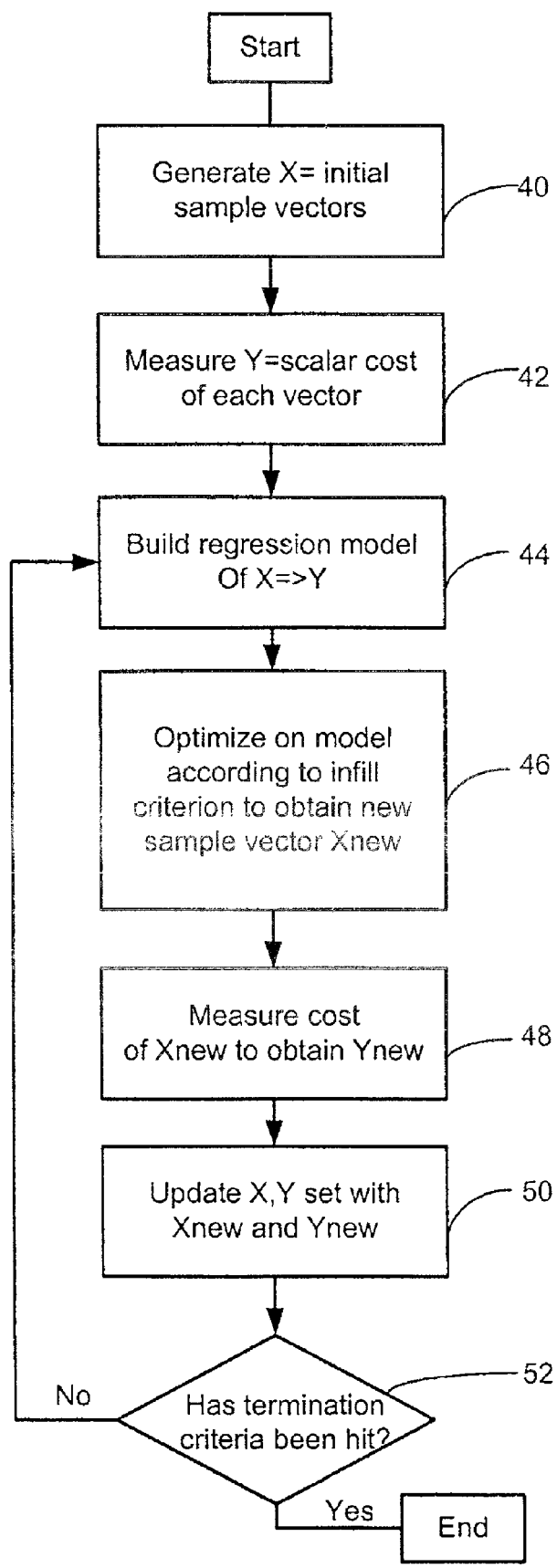
FIG. 2 is a flow chart of a prior art model building optimization method.
Figure 3:
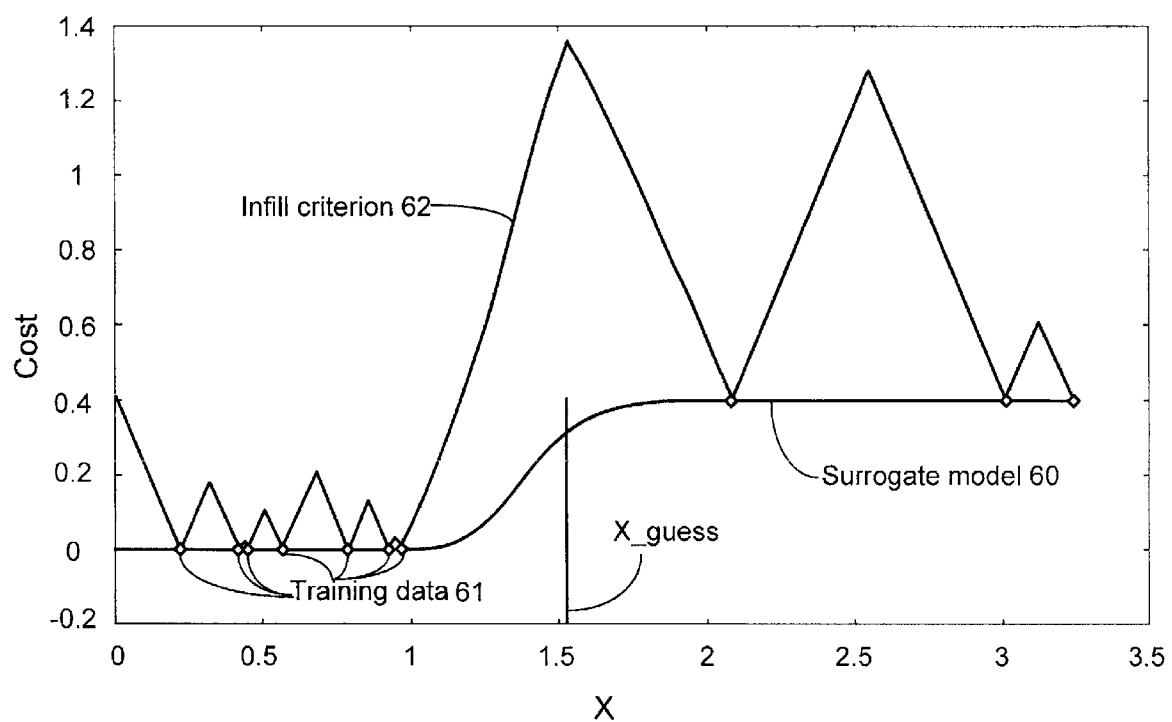
FIG. 3 shows an initial state of the prior art model building optimization method of FIG. 2.
Figure 4:
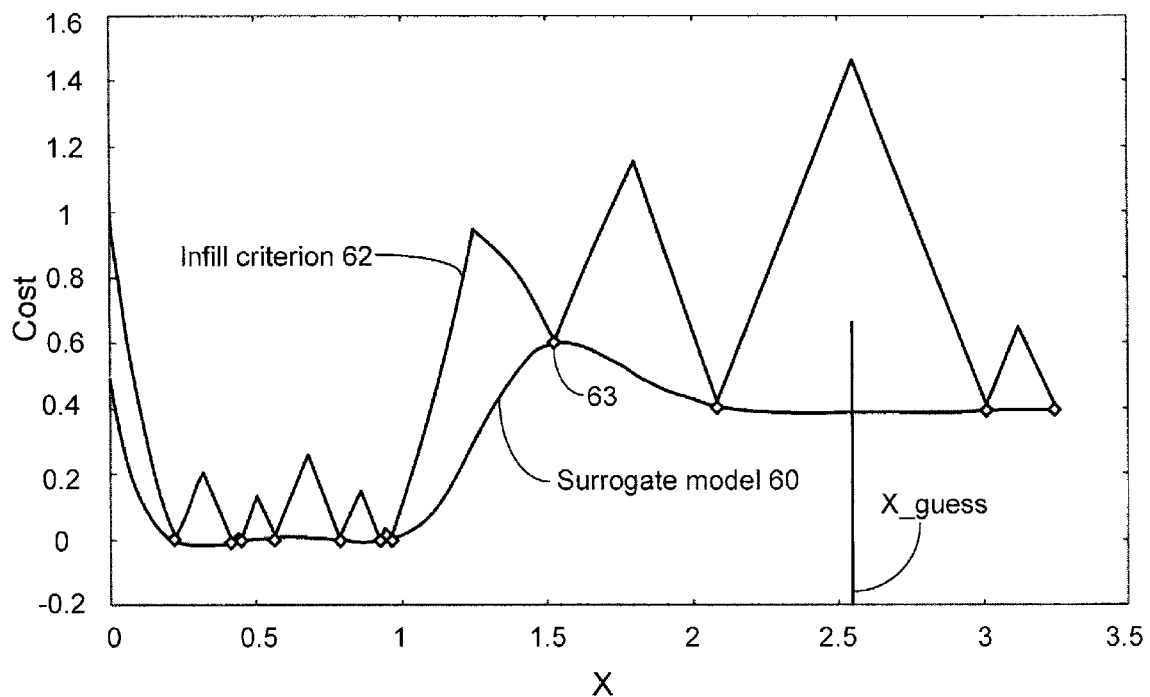
FIG. 4 shows another state of the prior art model building optimization method of FIG. 2.
Figure 5:
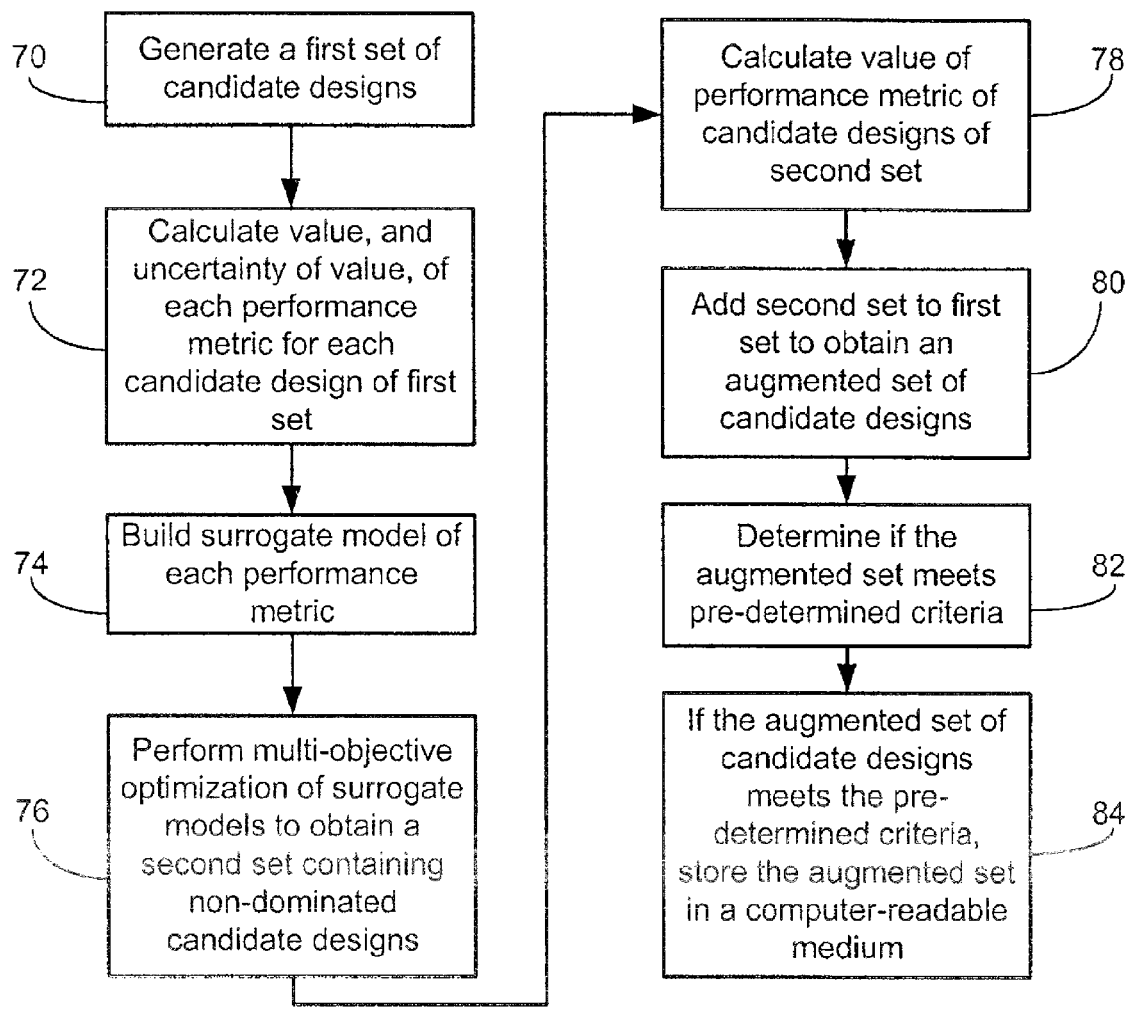
FIG. 5 shows a flow chart of an exemplary method of the present invention.

FIG. 5 shows a first example of a method of the present invention. Given a multi-parameter design (MPD) to optimize, the MPD having variables and performance metrics, the first step is to generate a first set of candidate designs, which is shown at 70. The first set of candidate designs can be generated by any suitable Design of Experiments (DOE) sampling technique. As will be understood by the skilled worker, such DOE techniques generally aim at generating candidate designs that are equi-distributed in the space defined by design variables of the MPD. As will also be understood by the skilled worker, the DOE techniques can also be adapted to generate candidate designs that are biased towards designer-supplied initial candidate designs. In one exemplary DOE sampling approach, it is assumed that each variable (e.g., a design variable, a process variable, an environmental variable, etc.) of the MPD has a minimum and a maximum value. Therefore, the group of ranges of each design variable defines a hypercube that bounds the possible values that can take the variables.

As an example of a DOE sampling technique, uniform sampling of the above hypercube can be performed to obtain a pre-determined number of candidate designs. As another example of a DOE sampling technique, latin hypercube sampling having uniform bias for each variable can be performed. As yet another example of a DOE sampling technique, convex optimization to maximize spread between candidate designs can be performed. A further example of a DOE sampling technique involves setting an initial candidate design and sweeping each design variable about the its initial value in addition to obtaining other candidate design by sampling within the hypercube of variables (e.g., through latin hypercube sampling).

Once the first set of candidate designs has been generated at step 70, the value of each performance metric for each candidate design is calculated along with its related uncertainty at step 72. The uncertainty can be obtained by, e.g., equating the uncertainty to the inverse distance to the closest candidate design or by any other suitable method. Subsequently, at step 74, a surrogate model for each performance metric is built, resulting in a set of surrogate models. Each surrogate model maps one or more of the design variables to a respective output value and to the uncertainty of each respective value. The set of surrogate model can include at least one regressor which can include, for example, at least one of ensembles of linear models, ensembles of polynomials, ensembles of piecewise polynomials, ensembles of splines, ensembles of feedforward neural networks, ensembles of support vectors, ensembles of kernel-based machines, ensembles of classification and regression trees, and ensembles of density estimations.

Once the surrogate models have been built at step 74, a multi-objective optimization of the surrogate models is performed at step 76. The objectives of the optimization include the performance metrics as represented by the surrogate models, and the uncertainties of the performance metrics. The performance metrics are optimized, i.e., depending on individual metrics, they can be maximized or minimized. For example, if the MPD is an electrical circuit design (ECD), a gain performance metric of the ECD can be maximized while a cross-talk performance metric of the ECD can be minimized. However, the uncertainties of the performance metrics are maximized. The multi-objective optimization of step 76 outputs a set of non-dominated candidate designs. An exemplary multi-objective optimization technique that can be used at step 76 is an evolutionary multi-objective optimization.

At step 78, the value of each performance metric for each non-dominated candidate design output at step 76 is calculated and, at step 80, the set of non-dominated candidate designs is added to the first set of candidate designs generated at step 70 to obtain an augmented set of candidate designs of the MPD. Subsequently, at step 82, the candidate designs are analyze to determine if they satisfy pre-determined criteria. Such criteria can include the proximity of the candidate designs performance metric values to pre-determined target performance values.

If, at step 82, it is determined that the candidates of the augmented set do meet the pre-determined criteria, then they are stored into any suitable type of computer-readable medium for future reference by a designer.

As will be understood by the skilled worker, if the pre-determined criteria are not met at step 82, the method shown at FIG. 5 can be modified by adding, following step 84, steps of substituting the candidate designs of the first set of candidate designs with the candidate designs of the augmented set of candidate designs, followed by deleting the set of non-dominated candidate designs, and then looping back to step 74 and continuing on until the pre-determined criteria are met.

To avoid having too great a number of non-dominated candidate designs to deal with, it is possible to reduce such number by any suitable technique. For example, clustering some of the non-dominated candidate designs through k-means clustering or bottom-up merge based clustering can be performed before going from step 76 to step 78.

As will be understood by the skilled worker, the MPD can be an ECD having performance metrics including, for example, gain and cross-talk between outputs. The ECD can also have design variables such as, for example, lengths and widths of devices on the ECD. The ECD can also have environmental variables such as, for example, operating temperature and load conditions. Further, the ECD can have process variables related to the manufacturing process used in fabricating the ECD in question.

Figure 6:
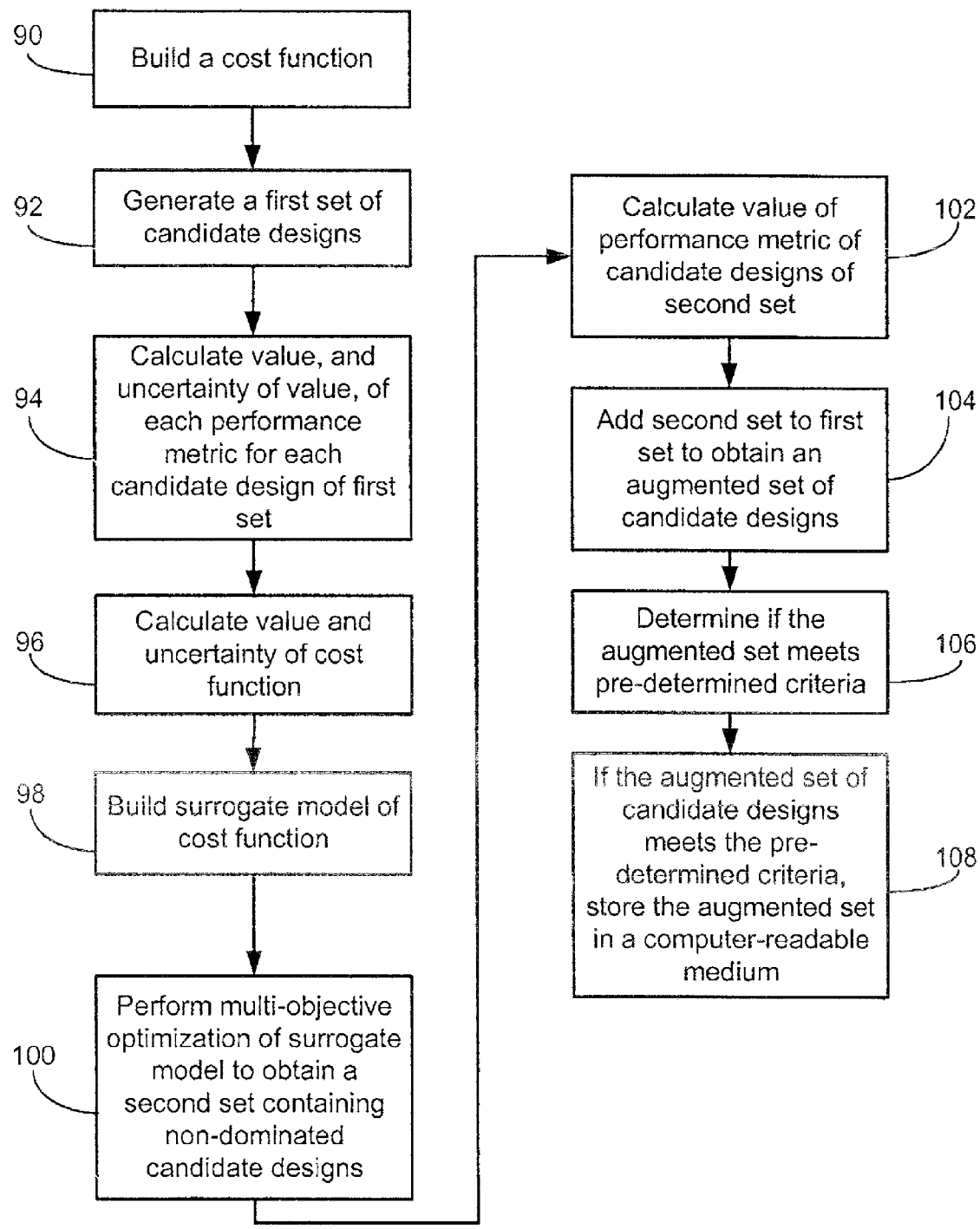
FIG. 6 shows a flow chart of another exemplary method of the present invention.

FIG. 6 shows a second example of a method of the present invention. Given a multi-parameter design (MPD) to optimize, the MPD having variables and performance metrics, the first step 90 is to build a cost function of the MPD. The cost function will generally depend on the performance metrics of the MPD, the performance metrics depending the variable of the MPD. The cost function can be a weighted sum of scaled performances of the MPD, a weighted sum of constraint violations, a product of scaled performances or violations, or any other suitable cost function. The function itself may be hidden from the user, or it may be specified by the designer. If weights are used, that is something that the designer can specify, or under-the-hood weights could get set automatically, such as equal weights or dynamically adapting weights. The subsequent step 92 is that of generating a first set of candidate designs and is akin to step 70, which is described above in relation to the previous exemplary method of the present invention. Subsequent step 92 is step 94 where a value of each performance metric is calculated along with an uncertainty of each calculated value. This step 94 is akin to step 72 described above in relation to the previous exemplary method of the present invention.

At step 96, the value of the cost function, and of the uncertainty of the value are calculated. Subsequent step 96, at step 98, a surrogate model of the cost function is built. The surrogate model in question maps a least one of the MPD's variables to the cost function and to the uncertainty of the cost function. At step 100, a multi-objective optimization is performed on the surrogate model built at step 98, with the objectives being an optimization of the cost and a maximization of the uncertainty of the cost. As will be understood by the skilled worker, step 100 is akin to step 76 described above In relation to the previous exemplary embodiment of the present invention. The multi-objective optimization of step 100 outputs a set of non-dominated candidate designs.

At step 102, the value of each performance metric for each non-dominated candidate design output at step 100 is calculated and, at step 104, the set of non-dominated candidate designs is added to the first set of candidate designs generated at step 92 to obtain an augmented set of candidate designs of the MPD. Subsequently, at step 106, the candidate designs are analyzed to determine if they satisfy pre-determined criteria. Such criteria include the proximity of the candidate designs performance metric values to pre-determined target performance values.

If, at step 106, t is determined that the candidates of the augmented set do meet the pre-determined criteria, then they are stored into any suitable type of computer-readable medium for future reference by a designer.

As will be understood by the skilled worker, if the pre-determined criteria are not met at step 106, the method shown at FIG. 6 can be modified by adding, following step 106, steps of substituting the candidate designs of the first set of candidate designs with the candidate designs of the augmented set of candidate designs, followed by deleting the set of non-dominated candidate designs, and then looping back to step 96 and continuing on until the pre-determined criteria are met.

The pseudocode of the second method example above is as follows:

(1) Generate initial set of sample vectors $X=\{x_1, x_2, \ldots\}$
(2) Measure scalar cost $y_i$ for each vector $x_i$, e.g. by simulation, to get $y=\{y_1, y_2, \ldots\}$
(3) Build a "surrogate" model using the $X \Rightarrow y$ training data, which will be used as the surrogate cost function for candidate x's in the subsequent step
(4) Via an inner optimization, choose P new sample points $\{x_{new1}, x_{new2}, x_{new3}, \ldots, x_{newP}\}$
   (4.1) Do multiobjective optimization on objectives (a) minimize surrogate cost and (b) maximize uncertainty to get nondominated set of N points
   (4.2) If N>P, reduce the N nondominated points down to P points
(5) Measure $y_{new1}$=cost of $x_{new1}$; $y_{new2}$=cost of $x_{new2}$; …
(6) Add $x_{new1}, x_{new2}, \ldots$ to X, and $y_{new}, y_{new2}; \ldots$ to y
(7) If termination criteria is hit, stop; else go to (3)

Figure 7:
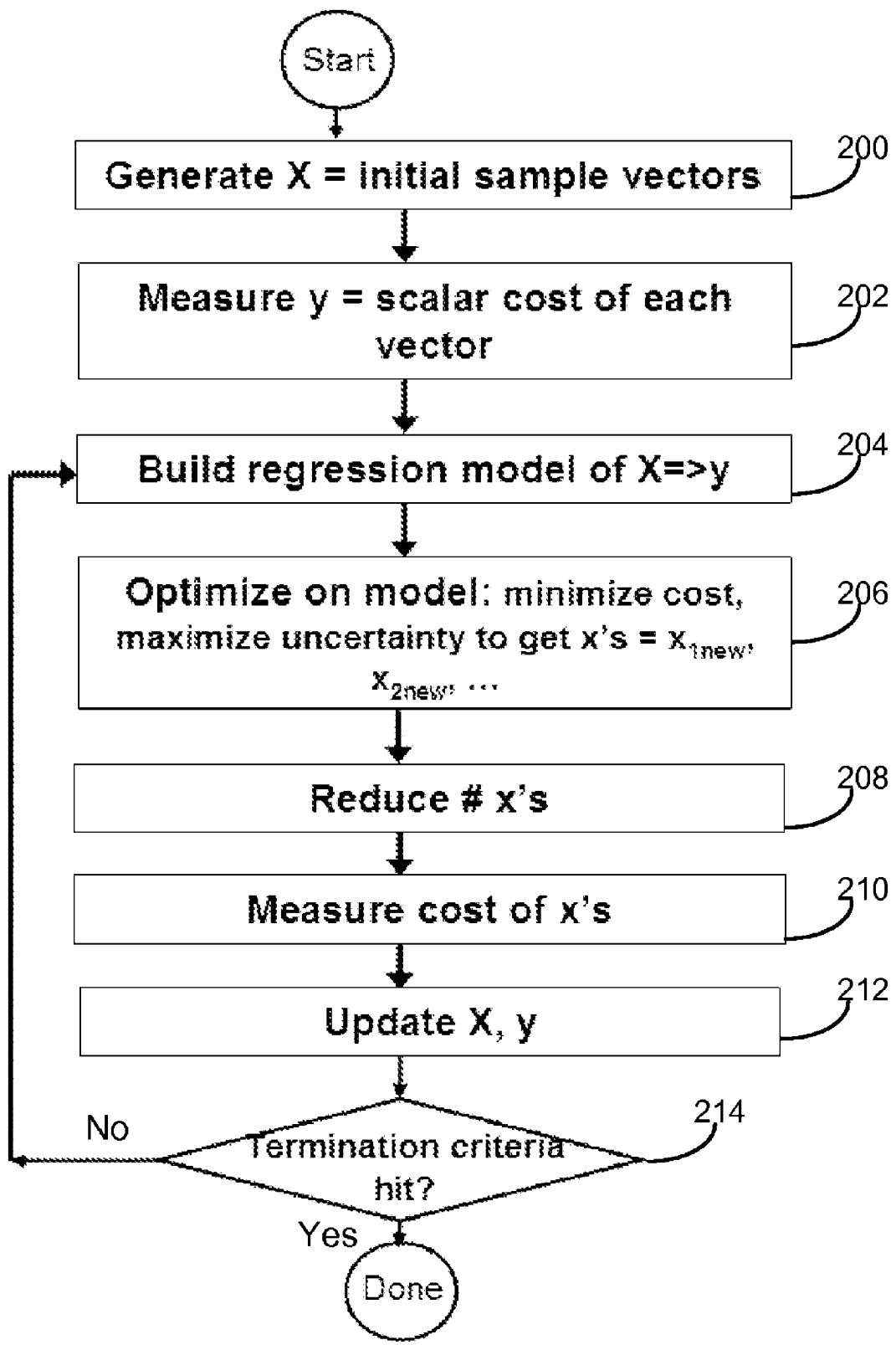
FIG. 7 shows a flow chart of another exemplary method of the present invention.

Compared to the pseudocode representing single-objective optimization, the main difference is that more than one $x_{new}$ is returned at once. The pseudocode of the second example is shown at FIG. 7, with reference numerals 200, 202, 204, 206, 208, 210, 212 and 214 corresponding respectively to steps 1 to 7 of the pseudo-code.

Figure 8:
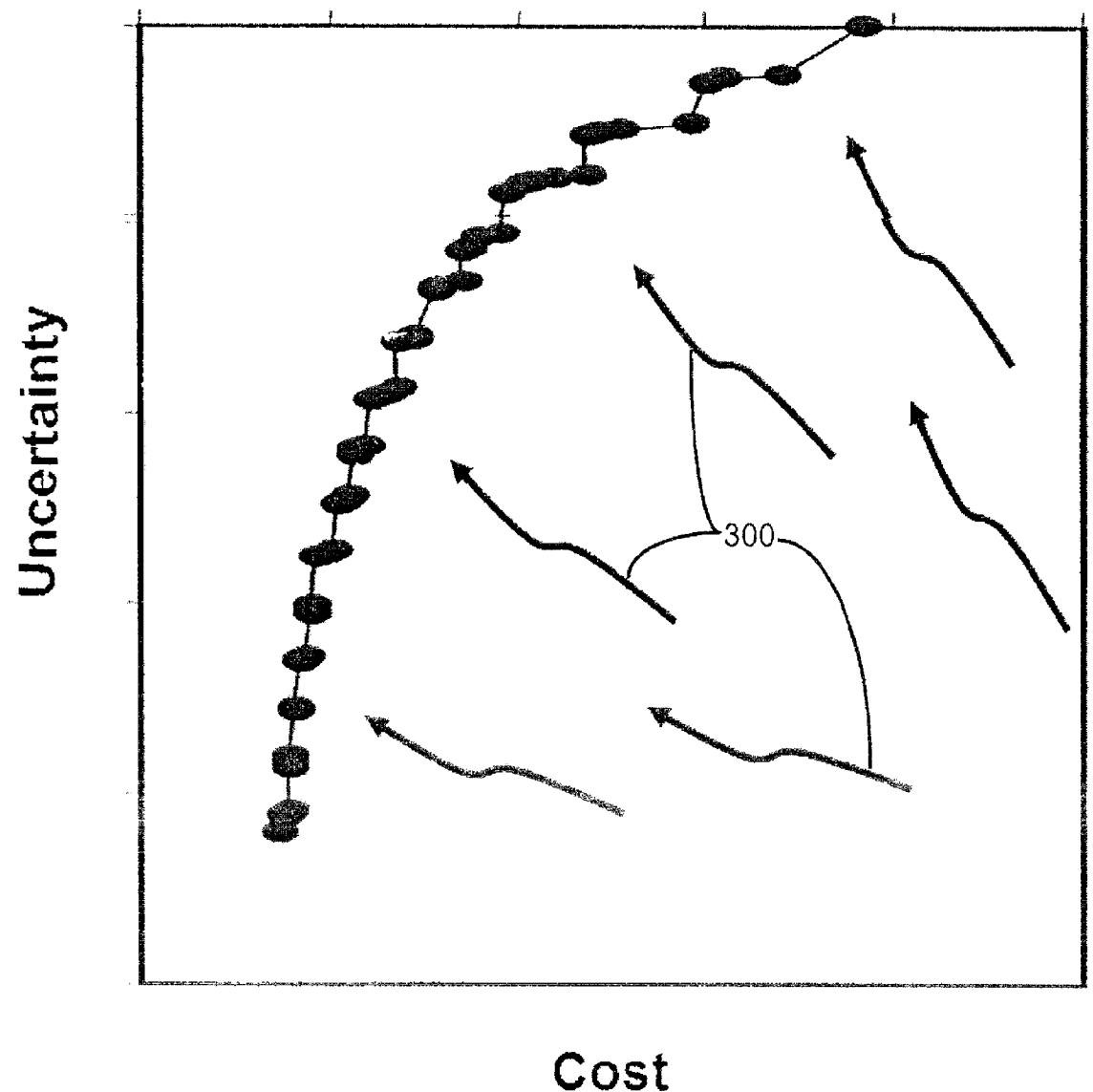
FIG. 8 shows a graph illustrating the behavior of a non-dominated candidate design front during an optimization run.

The idea of a multi-objective algorithm is to optimize on more than one objective simultaneously and to return a non-dominated set of design points (candidate designs); i.e., each point that is returned is not worse in all objectives than any other point. The behavior of a multi-objective optimizer can be thought of as pushing out the "non-dominated front", i.e. pushing out a set of points in performance space that collectively approximate the tradeoff among the multiple objectives optimized. FIG. 8 illustrates: the initial points in the search might have, for a particular cost function that needs to be minimized, a high cost with low uncertainty (i.e., near bottom right); but over time the optimization algorithm pushes the non-dominated front towards the top left. The arrows 300 indicate the general direction towards which the non-dominated front evolves. Many possible multi-objective algorithms might be used; evolutionary multi-objective algorithms are a good choice, such as K. Deb, K., Pratap. A, Agarwal, S., and Meyarivan, T. (2002). "A fast and elitist multi-objective genetic algorithm: NSGA-II". IEEE Transaction on Evolutionary Computation, 6(2), 181-197.

To avoid having too many candidate designs to optimize over, a reasonable approach is to cluster down the choices using a distance measure based on objective functions' space (performance metric and uncertainty). Many clustering algorithms exist, such as, for example, k-means clustering and bottom-up merge-based clustering. An additional heuristic can be to always take the lowest-cost and/or highest-uncertainty points, which helps to push the boundaries of exploitation and of exploration.

Use of a multi-objective inner optimization algorithm accomplishes many goals at once. First, rather than past approaches, which attempt to reconcile exploration vs. exploitation via a pre-chosen infill criterion that is a function of uncertainty and cost, it treats them explicitly as two different objectives. By doing so, it bypasses all issues associated with choice of infill criterion, such as poorly structured fitness landscapes and overly biasing towards explore vs. exploit. The high sensitivity to choice of infill criterion is removed because the infill criterion itself is removed. Second, it directly generates more than one candidate design point in one optimization run with reasonable independence among objectives which mitigates the runtime of model-building and of model simulation by a factor of P.

To help understand why "uncertainty" is maximized rather than minimized, it can be thought of as "improvement potential" or "negative exploitedness". If there are points A and B with identical cost but A has higher uncertainty, then A dominates (is better than) point B because A has more improvement potential than B. If there are points C and D with equivalent uncertainty but C has lower cost, then C dominates D because C is a more promising design for the same level of exploitedness.

A surrogate model can be a nonlinear regressor that outputs uncertainty, yet has good model-building and simulation runtime and scaling with respect to number of training samples, and number of input variables. This can be accomplished by choosing any suitable regressor that has good properties for all of the above. Such regressors include: feed-forward neural networks, support vector machines, splines, and more. Subsequently, with the chosen regressor, create a set of regressors that are relatively independent of each other. The final output regressor is merely the ensemble of these regressors; its output is the average output among the regressors, and its uncertainty is merely the standard deviation of the output among the regressors. The remaining challenge is to create regressors that are relatively independent of each other.

Some regressors, such as feedforward neural networks, are already somewhat unstable, which means that given the same set of training data many different models can be created. Here, that's actually a good thing, because the output is averaged; the places where the differences lie do tend to be where the models are most uncertain. Overfitting is not an issue either because overfitting happens in different places for different models. Another tactic to get independence among regression models, especially for more stable approaches like support vector machines, is to choose different training data for each regressor. A good typical approach is merely using sampling with replacement (i.e., bootstrapping): if there are T training samples available, then randomly choose a sample from among the T samples having a 1/T probability per sample, and repeat this until a target number of samples is chosen (a typical target is T samples). This means that for a given regressor there are usually duplicates or even triplicates of some samples, and none of other samples. Each set of training data for each regressor is different, which means that each regressor in the final regressor ensemble will be different. The number of regressors in the ensemble can be small because all that is needed of the ensemble is to differentiate uncertainty for different points in design space; in practice as few as five regressors in the ensemble can be effective. Furthermore, training of individual regressors does not need to be perfect, because the regressors are continually being refreshed in each iteration of the algorithm's outer loop (for example, between steps 74 and 82 of the first exemplary method above). In sum, the approach to estimate uncertainty yet scale is to merely use a small ensemble of somewhat independent regressors.

There are other variants of the invention to resolve exploration vs. exploitation. Apart form using multi-objective inner optimization, another option is to use a single-objective optimization on infill criterion, but to stochastically change the weighting towards uncertainty vs. towards surrogate cost with each invocation of an inner optimization algorithm. For example, assuming that both uncertainty and cost have values scaled in the same range and that the LCB criterion is used, minimize [$w_{cost}$* surrogate_cost(x)–$W_{uncertainty}$* uncertainty(x)]. Where $W_{cost}$ and $W_{uncertainty}$ are weighing factors of cost and uncertainty respectively. Subsequently, at a given invocation of inner optimization: draw $w_{cost}$ from a uniform distribution in [0.0, 1.0]; and $w_{uncertainty}$=1.0–$w_{cost}$. This means that sometimes there is high bias to exploitation and low bias to exploration; sometimes it is opposite, and sometimes it is even an extremely high bias one way or the other. But in general it means that the exact choice of weight will not accidentally constrain the search towards too much exploration, or too much exploitation. There are variants of this as well, e.g. we can bias the distribution for drawing $w_{cost}$ to be more towards 1.0 if there is a preference to exploitation; or it is possible to draw from a restricted range such as [0.2, 0.8] which means that there will always be some bias to exploration and also to exploitation.

Figure 9:
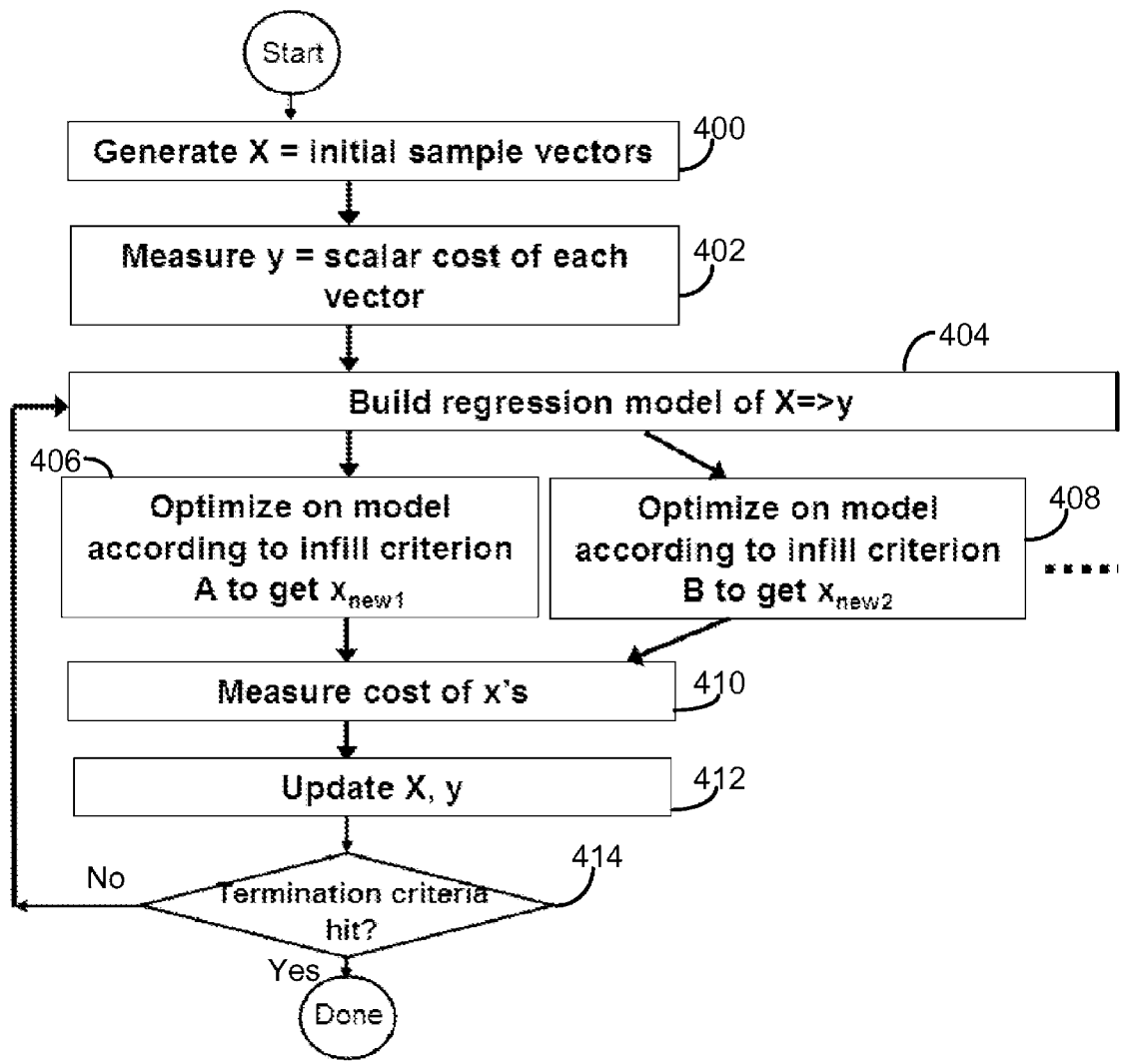
FIG. 9 shows a flow chart of another exemplary method of the present invention.

Other variants of the present invention aim to resolve speed issues in model building and simulation by generating more than one candidate design (design point) at once for a given model. We have already mentioned the variant that uses multi-objective optimization, which naturally outputs more than one candidate design for a given model. Another variant is to use a single-objective optimization, in which a "point" in that optimization's space is a set of P design points (P>1) in the outer optimization's space; the objective combines the infill criterion and a measure of spread of those P points. An example measure of spread for an inner "point" is the average distance between all the outer design points that the inner "point" has. If model simulation time is not an issue but model building time is an issue (which can readily be the case), then another simple variant is to merely run a number of inner optimizations for each model. Then there needs to be some way to get the results of those inner optimizations to be somewhat independent. One way is to use LCB infill criterion with a different stochastically chosen weight for cost, $w_{cost}$, for each inner optimization on that same model. Another way is to first do one single-objective run using any infill criterion, then a second run which combines the infill criterion but also tries to maximize distance to the first run's results, then a third run which combines the infill criterion but also tries to maximize distance to the first and second runs' results, etc. These last two variants are illustrated at FIG. 9 where initial sample vectors are generated at step 400, the scalar cost of each vector is measured at step 402, a regression model is built at step 404, optimization on the regression model is done at steps 406 and 408, the cost are measured at step 410, an update to the initial sample vectors and their scalar cost is made at step 412 and finally, at step 414, verification is made if a termination criteria has been hit. In general, the algorithm designer's decision making for which approach is the most appropriate is dependent on the relative time taken for model building, vs. inner optimization, vs. calculating the true cost.

One variant of the present invention is to apply the inner multi-objective implementation described above to problems that naturally have more than one outer objective rather than just "cost" which typically has lumped together goals a priori. Then there is one regression model for each of the objectives. For example, in circuit design, rather than minimizing "cost", the objectives may be: minimize power, maximize gain, and maximize slew rate. Constraints can be incorporated into this approach too: e.g. they can be lumped into one overall objective, or treated separately as objectives. A sub-variant is: some (but not all) of the objectives may be cheap to compute, therefore not requiring regression models. An example in electrical circuit design is the measure for "area" which can be estimated very cheaply, e.g., as a simple sum of (width*length) for each transistor, resistor, and capacitor in the circuit. Another sub-variant is: while there is more than one objective for the outer optimization problem, each inner optimization is accomplished by lumping together all those objectives into one "cost" objective. The lumping happens via a weighted sum, where the weights are chosen in one of many ways, e.g. stochastically or according to which regions in performance space are deemed to need more exploration. In the inner optimization, this lumped "cost" objective can be handled via a single-objective optimization using an infill criterion, or via a multi-objective optimization of cost and uncertainty.

Another variant of the present invention applies when the estimate of cost (or of each objective) of a design has its own uncertainty, such as in robust design or in noisy physical experiments. For example, if the outer objective function is yield of a circuit, that yield can be estimated by taking 50 Monte Carlo samples, and each sample is a simulation. Accordingly, the yield=(number of feasible samples)/50. The uncertainty can be modeled via a binomial density function. Another example is where the estimates of cost of a given design is subject to experimental noise; e.g., when actual physical experiments are run such as testing a robot's behavior in a physical environment, or running chemical experiments. This uncertainty can be readily Incorporated Into the present framework: it merely contributes to the regressor's estimate of the uncertainty in the inner optimization. That is, $unc_{inner\_overall} = f(unc_{outer\_measure}, unc_{inner\_regressor})$. For example, if we assume that $unc_{outer\_measure}$ and $unc_{inner\_regressor}$ are independent (usually reasonable), then $\sigma^2_{inner\_overall} = \sigma^2_{outer\_measure} + \sigma^2_{inner\_regressor}$. Beyond that, the fit to the problem is direct because the optimization already explicitly accounts for uncertainty. For example, if a design point has been measured once already but has high uncertainty, but it (or its region) continues to show promise, then it will be sampled again (or nearby), and the model's uncertainty in that region will decrease.

A specific electrical circuit example is where a candidate design of an operational amplifier has had 50 Monte-Carlo samples calculated and there is one cost estimate per sample. The average of the 50 cost values can be taken to be the cost estimate, and the variance of the 50 cost values can be incorporated into the uncertainty measure.

Figure 10:
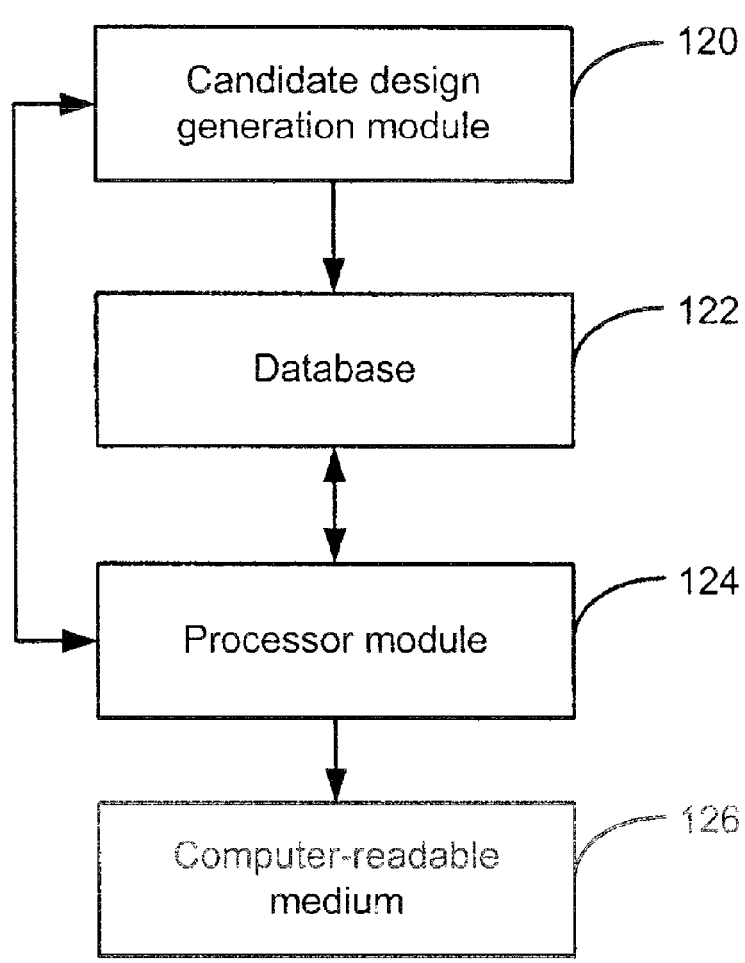
FIG. 10 shows an embodiment of a system of the present invention.

An embodiment of a system of the present invention that can be used to optimize a MPD is shown at reference numeral 118 of FIG. 10. The system 118 includes a candidate design generation module (CDGM) 120, a database 122, a processor module 124 and a computer-readable medium 126. The CDGM 120 can include all the particulars of the MPD to be optimized, such particulars being, e.g., design variables, such as minimum and maximum values; environmental variables; random variables, which can be in the form of a probability density function from which random sample values can be drawn. The CDGM 120 also includes a processor (not shown) programmed to output a first set of candidate design in accordance with the particulars and pre-determined criteria. As will be understood by the skilled worker, such criteria can be related to, e.g., latin hypercube sampling, to any other suitable DOE sampling approach, or to any other suitable candidate design generation approach.

The CDGM 120 outputs generated candidate designs to a database 122, which is accessed by a processor module 124. The processor module 124 can also access the CDGM to obtain performance metric definitions for the MPD in question and can calculate the performance metric value and uncertainty of each candidate design of the first set of candidate design and add those calculated values to the first set. As will be understood by the skilled worker, the CDGM 120 could also be programmed to calculate the performance metrics in question and these could be stored in the database 122.

The processor module 124 builds a surrogate model for each performance metric based on the performance metric of the candidate designs of the first set of candidate designs. The surrogate models are such that they map at least one variable of the MPD to an output value and to an uncertainty of the output value.

The processor module 124 then proceeds to do multi-objective optimization of the surrogate models by optimizing each performance metric in accordance with pre-determined criteria and by maximizing the uncertainty of each performance metric. The multi-objective optimization, in accordance with pre-determined conditions, provides a number of non-dominated candidate designs that form a second set of candidate designs. Subsequently, the processor module 124 calculates a value and uncertainty for each candidate design of the second set of candidate designs and adds these candidate designs and their values to the first set of candidate designs to obtain an augmented set of candidate designs.

Finally, the processor module 124 compares the candidate designs of the augmented set to determine if they meet pre-determined target criteria. If they do, the processor module 124 outputs the candidate designs of the augmented set to a computer-readable medium 126, which can be accessed by a user for further analysis or use.

As will be understood by the skilled worker, if, instead of optimizing each performance metric and the uncertainty of the performance metrics, a designer wishes to optimize a cost function associated to the performance metrics and to variables of the MPD, the system 118 can be modified to include a cost function generation module (not shown) that outputs the cost function to the database 122 and/or is in communication with the processor module 124. In this scenario, the processor module 124 extracts the candidate designs from the database and calculates a value of each performance metric for each candidate design of the first set to obtain performance metric calculated values each having an uncertainty associated therewith.

The processor module 124 then, in accordance with the performance metric calculated values, calculates a value of the cost function and an uncertainty of each value of the cost function for each candidate design. The processor module 124 goes on, in accordance with the calculated values of the cost functions and of their respective uncertainties, to build a surrogate model of the cost function, the surrogate model mapping at least one variable to an output value of the surrogate model of the cost function and to an uncertainty of the output value.

Subsequently, the processor module 124 performs a multi-objective optimization on the surrogate model of the cost function to obtain a second set of candidate designs containing non-dominated candidate designs of the MPD. The multi-objective optimization optimizes the surrogate model of the cost function in accordance with pre-determined constraints, the multi-objective optimization also maximizing the uncertainty of the surrogate model of the cost function. Following this, the processor module 124 calculates a value of each performance metric for each candidate design of the second set, and adds the second set to the first set to obtain an augmented set of candidate designs. Finally, the processor module 124 determines if the augmented set of candidate designs of the MPD meets pre-determined criteria. If the augmented set does meet the pre-determined criteria, then the processor module 124 outputs the augmented set to the computer-readable medium 126.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifica-

What is claimed is:

1. A tangible, non-transitory computer-readable medium having recorded thereon statements and instructions for execution by a computer of a method to optimize a multi-parameter design (MPD) having variables and performance metrics, wherein each performance metric is a function of at least one of the variables, the method comprising steps of:
   a) generating a first set of candidate designs of the MPD;
   b) calculating a value of each performance metric for each candidate design of the first set, each calculated value having an uncertainty associated therewith;
   c) building a surrogate model of each performance metric to obtain a set of surrogate models, each surrogate model mapping at least one variable to a respective output value and to an uncertainty of the respective output value;
   d) performing a multi-objective optimization on the set of surrogate models to obtain a second set of candidate designs containing non-dominated candidate designs of the MPD, the multi-objective optimization optimizing the surrogate model of each performance metric in accordance with pre-determined constraints, the multi-objective optimization also maximizing the uncertainty of the surrogate model of each performance metric;
   e) calculating a value of each performance metric for each candidate design of the second set;
   f) adding the second set to the first set to obtain an augmented set of candidate designs;
   g) determining if the augmented set of candidate designs of the MPD meets pre-determined criteria; and
   h) if the augmented set of candidate designs meets the pre-determined criteria, storing the augmented set of candidate designs in a non-transitory computer-readable memory.

2. The tangible, non-transitory computer-readable medium of claim 1, wherein the method further comprises:
   i) if the augmented set of candidate designs fails to meet the pre-determined criteria:
      A) substituting the candidate designs of the first set of candidate designs with the candidate designs of the augmented set of candidate designs;
      B) deleting the second set of candidate designs; and
      C) repeating steps (c) through (g).

3. The tangible, non-transitory computer-readable medium of claim 1 wherein the set of surrogate models includes at least one regressor.

4. The tangible, non-transitory computer-readable medium of claim 3 wherein each of the at least one regressor includes at least one of ensembles of linear models, ensembles of polynomials, ensembles of piecewise polynomials, ensembles of splines, ensembles of feedforward neural networks, ensembles of support vectors, ensembles of kernel-based machines, ensembles of classification and regression trees, and ensembles of density estimations.

5. The tangible, non-transitory computer-readable medium of claim 1 wherein the step of performing a multi-objective optimization includes performing an evolutionary multi-objective optimization.

6. The tangible, non-transitory computer-readable medium of claim 1 wherein the method further comprises, following step (d), a step of reducing a number of non-dominated designs.

7. The tangible, non-transitory computer-readable medium of claim 6 wherein the step of reducing the number of non-dominated designs includes a step of clustering the non-dominated designs.

8. The tangible, non-transitory computer-readable medium of claim 7 wherein the step of clustering the non-dominated designs includes at least one of performing k-means clustering and bottom-up merge based clustering.

9. The tangible, non-transitory computer-readable medium of claim 1 wherein the pre-determined criteria include target performance values.

10. The tangible, non-transitory computer-readable medium of claim 1 wherein the step of generating a first set of candidate designs of the MPD includes generating the candidate designs by performing a Design of Experiment (DOE) sampling technique of the variables.

11. The tangible, non-transitory computer-readable medium of claim 10 wherein the DOE sampling technique includes latin hypercube sampling.

12. The tangible, non-transitory computer-readable medium of claim 1 wherein the MPD is an electrical circuit design.

13. The tangible, non-transitory computer-readable medium of claim 12 wherein the variables include at least one of design variables, environmental variables and process variables, and the performance metrics include at least one of area, power consumption, gain and bandwidth.

14. The tangible, non-transitory computer-readable medium of claim 1 wherein step (d) is followed by a step of adding a candidate design to the second set by selecting one of the non-dominated candidate designs and by randomly changing at least one value of the variables of the selected non-dominated design.

15. The tangible, non-transitory computer-readable medium of claim 14 wherein the randomly changing at least one value of the variables of the selected non-dominated design is done in accordance with a Gaussian distribution function having a mean substantially equal to the value of the selected non-dominated design.

16. The tangible, non-transitory computer-readable medium of claim 1 wherein step (d) is followed by a step of adding a candidate design to the second set by selecting one of the non-dominated candidate designs and by locally optimizing the selected non-dominated candidate design.

17. The tangible, non-transitory computer-readable medium of claim 16 wherein the locally optimizing the non-dominated candidate design includes performing at least one of a gradient descent optimization, a second order gradient descent optimization and a pattern search technique.

18. The tangible, non-transitory computer-readable medium of claim 1 wherein the uncertainty of each surrogate model's output is proportional to a distance between the surrogate model's output value and a corresponding, closest performance metric value in the first set of candidate designs of the MPD.

19. The tangible, non-transitory computer-readable medium of claim 1 wherein the uncertainty of each surrogate model's output is intrinsic to the surrogate model in question.

20. The tangible, non-transitory computer-readable medium of claim 19 wherein at least one of the surrogate models is one of a kriging model and a density estimation model.

21. The tangible, non-transitory computer-readable medium of claim 1 wherein at least one surrogate model is a function of sub-models with an output uncertainty that is a function of outputs of the sub-models.

22. The tangible, non-transitory computer-readable medium of claim 21 wherein the output uncertainty is a standard deviation of the outputs of the sub-models.

23. A tangible, non-transitory computer-readable medium having recorded thereon statements and instructions for execution by a computer of a method to optimize a multi-parameter design (MPD) having variables and performance metrics, each performance metric being a function of at least one of the variables, the method comprising steps of:
a) building a cost function of the MPD, the cost function depending on the performance metrics;
b) generating a first set of candidate designs of the MPD;
c) calculating a value of each performance metric for each candidate design of the first set to obtain performance metric calculated values each having an uncertainty associated therewith;
d) in accordance with the performance metric calculated values, calculating a value of the cost function and an uncertainty of each value of the cost function for each candidate design;
e) in accordance with the calculated values of the cost functions and of their respective uncertainties, building a surrogate model of the cost function, the surrogate model mapping at least one variable to an output value of surrogate model of the cost function and to an uncertainty of the output value;
f) performing a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function;
g) calculating a value of each performance metric for each candidate design of the second set;
h) adding the second set to the first set to obtain an augmented set of candidate designs;
i) determining if the augmented set of candidate designs of the MPD meets pre-determined criteria; and
j) if the augmented set of candidate designs meets the pre-determined criteria, storing the augmented set of candidate designs in a non-transitory computer-readable memory.

24. The tangible, non-transitory computer-readable medium of claim 23 wherein the method further comprises:
k) if the augmented set of candidate designs fails to meet the pre-determined criteria:
A) substituting the candidate designs of the first set of candidate designs with the candidate designs of the augmented set of candidate designs;
B) deleting the second set of candidate designs; and
C) repeating steps (e) through (i).

25. The tangible, non-transitory computer-readable medium of claim 23 wherein a set of surrogate models includes at least one regressor.

26. The tangible, non-transitory computer-readable medium of claim 25 wherein each of the at least one regressor includes at least one of ensembles of linear models, ensembles of polynomials, ensembles of piecewise polynomials, ensembles of splines, ensembles of feedforward neural networks, ensembles of support vectors, ensembles of kernel-based machines, ensembles of classification and regression trees, and ensembles of density estimations.

27. The tangible, non-transitory computer-readable medium claim 23 wherein the step of performing a multi-objective optimization includes performing an evolutionary multi-objective optimization.

28. The tangible, non-transitory computer-readable medium of claim 23 further comprising, following step (d), a step of reducing a number of non-dominated designs.

29. The tangible, non-transitory computer-readable medium of claim 28 wherein the step of reducing the number of non-dominated designs includes a step of clustering the non-dominated designs.

30. The tangible, non-transitory computer-readable medium of claim 29 wherein the step of clustering the non-dominated designs includes at least one of performing k-means clustering and bottom-up merge based clustering.

31. The tangible, non-transitory computer-readable medium of claim 23 wherein the pre-determined criteria include target performance values.

32. The tangible, non-transitory computer-readable medium of claim 23 wherein the step of generating a first set of candidate designs of the MPD includes generating the candidate designs by performing a Design of Experiment (DOE) sampling technique of the variables.

33. The tangible, non-transitory computer-readable medium of claim 32 wherein the DOE sampling technique includes hypercube sampling.

34. The tangible, non-transitory computer-readable medium method of claim 23 wherein the MPD is an electrical circuit design.

35. The tangible, non-transitory computer-readable medium of claim 34 wherein the variables include at least one of design variables, environmental variables and process variables, and the performance metrics include at least one of area, power consumption, gain and bandwidth.

36. The tangible, non-transitory computer-readable medium of claim 23 wherein step (d) is followed by a step of adding a candidate design to the second set by selecting one of the non-dominated candidate designs and by randomly changing at least one value of the variables of the selected non-dominated design.

37. The tangible, non-transitory computer-readable medium of claim 36 wherein the randomly changing at least one value of the variables of the selected non-dominated design is done in accordance with a Gaussian distribution function having a mean substantially equal to the value of the selected non-dominated design.

38. The tangible, non-transitory computer-readable medium of claim 23 wherein step (d) is followed by a step of adding a candidate design to the second set by selecting one of the non-dominated candidate designs and by locally optimizing the selected non-dominated candidate design.

39. The tangible, non-transitory computer-readable medium of claim 38 wherein the locally optimizing the non-dominated candidate design includes performing at least one of a gradient descent optimization, a second order gradient descent optimization and a pattern search technique.

40. The tangible, non-transitory computer-readable medium of claim 23 wherein the uncertainty of each surrogate model's output is proportional to a distance between the surrogate model's output value and a corresponding, closest performance metric value in the first set of candidate designs of the MPD.

41. The tangible, non-transitory computer-readable medium of claim 23 wherein the uncertainty of each surrogate model's output is intrinsic to the surrogate model in question.

42. The tangible, non-transitory computer-readable medium of claim 41 wherein at least one of the surrogate models is one of a kriging model and a density estimation model.

43. The tangible, non-transitory computer-readable medium of claim 23 wherein at least one surrogate model is a function of sub-models with an output uncertainty that is a function of outputs of the sub-models.

44. The tangible, non-transitory computer-readable medium of claim 43 wherein the output uncertainty is a standard deviation of the outputs of the sub-models.

45. A system to optimize a multi-parameter design (MPD) having variables and performance metrics, each performance metric being a function of at least one of the variables, the system comprising:
  a candidate design generation module to generate a first set of candidate designs of the MPD;
  a database in communication with the candidate design generation module, the database to store the first set of candidate designs of the MPD;
  a processor module in communication with the database, the processor module:
    a) to extract the candidate designs from the database;
    b) to calculate the performance metrics of each candidate design, each performance metric having an uncertainty associated therewith;
    c) to build a surrogate model of each performance metric to obtain a set of surrogate models, each surrogate model mapping at least one variable to a respective output value and to an uncertainty of the respective output value;
    d) to perform a multi-objective optimization on the set of surrogate models to obtain a second set of candidate designs containing non-dominated candidate designs of the MPD, the multi-objective optimization optimizing the surrogate model of each performance metric in accordance with pre-determined constraints, the multi-objective optimization also maximizing the uncertainty of the surrogate model of each performance metric;
    e) to calculate a value of each performance metric for each candidate design of the second set;
    f) to add the second set to the first set to obtain an augmented set of candidate designs; and
    g) to determine if the augmented set of candidate designs of the MPD meets pre-determined criteria;
    and
  a non-transitory computer readable medium in communication with the processor module, the non-transitory computer readable medium to store the augmented set of candidate designs.

46. A system to optimize a multi-parameter design (MPD) having variables and performance metrics, each performance metric being a function of at least one of the variables, the system comprising:
  a cost function generation module to generate a cost function of the MPD, the cost function depending on the performance metrics;
  a candidate design generation module to generate a first set of candidate designs of the MPD;
  a database in communication with the candidate design generation module and with the cost function generation module, the database to store the first set of candidate designs and to store the cost function;
  a processor module in communication with the database, the processor module:
    a) to extract the candidate designs from the database;
    b) to calculate a value of each performance metric for each candidate design of the first set to obtain performance metric calculated values each having an uncertainty associated therewith;
    c) in accordance with the performance metric calculated values, to calculate a value of the cost function and an uncertainty of each value of the cost function for each candidate design;
    d) in accordance with the calculated values of the cost functions and of their respective uncertainties, to build a surrogate model of the cost function, the surrogate model mapping at least one variable to an output value of the surrogate model of the cost function and to an uncertainty of the output value;
    e) to perform a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function;
    f) to calculate a value of each performance metric for each candidate design of the second set;
    g) to add the second set to the first set to obtain an augmented set of candidate designs; and
    h) to determine if the augmented set of candidate designs of the MPD meets pre-determined criteria;
    and
  a non-transitory computer readable medium in communication with the processor module, the non-transitory computer readable medium to store the augmented set of candidate designs.

47. A non-transitory computer readable medium having recorded thereon statements and instructions for execution by a computer to carry out a method to optimize a multi-parameter design (MPD), the method comprising steps of:
  a) generating a first set of candidate designs of the MPD;
  b) calculating a value of each performance metric for each candidate design of the first set, each calculated value having an uncertainty associated therewith;
  c) building a surrogate model of each performance metric to obtain a set of surrogate models, each surrogate model mapping at least one variable to a respective output value and to an uncertainty of the respective output value;
  d) performing a multi-objective optimization on the set of surrogate models to obtain a second set of candidate designs containing non-dominated candidate designs of the MPD, the multi-objective optimization optimizing the surrogate model of each performance metric in accordance with pre-determined constraints, the multi-objective optimization also maximizing the uncertainty of the surrogate model of each performance metric;
  e) calculating a value of each performance metric for each candidate design of the second set;
  f) adding the second set to the first set to obtain an augmented set of candidate designs;
  g) determining if the augmented set of candidate designs of the MPD meets pre-determined criteria; and
  h) while a termination criteria is not met, the termination criteria being at least one of the augmented set of candidate designs being substantially equal to a pre-determined set of target candidate designs, a maximum runtime of the method being reached, a maximum computational cost being reached, a minimum improvement requirement of the augmented set of candidate designs not being met between two successive iterations of steps (c) through (g), and a maximum number of iterations of steps (c) though (g) being reached:
  A) substituting the candidate designs of the first set of candidate designs with the candidate designs of the augmented set of candidate designs;
  B) deleting the second set of candidate designs; and
  C) repeating steps (c) through (g).

48. A non-transitory computer readable medium having recorded thereon statements and instructions for execution by a computer to carry out a method to optimize a multi-parameter design (MPD), the method comprising steps of:
  a) building a cost function of the MPD, the cost function depending on performance metrics of candidate designs of the MPD;
  b) generating a first set of the candidate designs of the MPD;
  c) calculating a value of each performance metric for each candidate design of the first set to obtain performance metric calculated values each having an uncertainty associated therewith;
  d) in accordance with the performance metric calculated values, calculating a value of the cost function and an uncertainty of each value of the cost function for each candidate design;
  e) in accordance with the calculated values of the cost functions and of their respective uncertainties, building a surrogate model of the cost function, the surrogate model mapping at least one variable to an output value of surrogate model of the cost function and to an uncertainty of the output value;
  f) performing a multi-objective optimization on the surrogate model of the cost function to obtain a second set of candidate designs containing non-dominated candidate designs of the MPD, the multi-objective optimization optimizing the surrogate model of the cost function in accordance with pre-determined constraints, the multi-objective optimization also maximizing the uncertainty of the surrogate model of the cost function;
  g) calculating a value of each performance metric for each candidate design of the second set;
  h) adding the second set to the first set to obtain an augmented set of candidate designs;
  i) determining if the augmented set of candidate designs of the MPD meets pre-determined criteria; and
  j) while a termination criteria is not met, the termination criteria being at least one of the augmented set of candidate designs being substantially equal to a pre-determined set of target candidate designs, a target cost of the cost function being met, a maximum runtime of the method being reached, a maximum computational cost being reached, a minimum improvement requirement of the augmented set of candidate designs not being met between two successive iterations of steps (e) through (i), and a maximum number of iterations of steps (e) though (i) being reached:
    A) substituting the candidate designs of the first set of candidate designs with the candidate designs of the augmented set of candidate designs;
    B) deleting the second set of candidate designs; and
    C) repeating steps (e) through (i).

* * * * *

UNITED STATES PATENT AND TRADEMARK OFFICE
CERTIFICATE OF CORRECTION

| | | |
|---|---|---|
| PATENT NO. | : 8,006,220 B2 | Page 1 of 1 |
| APPLICATION NO. | : 12/237069 | |
| DATED | : August 23, 2011 | |
| INVENTOR(S) | : Trent Lome McConaghy et al. | |

It is certified that error appears in the above-identified patent and that said Letters Patent is hereby corrected as shown below:

Column 13, Line 38, delete "t" and insert therefor --it--.

Claim 34, Column 22, Line 28, delete "method".

Signed and Sealed this

Eighth Day of November, 2011

David J. Kappos
*Director of the United States Patent and Trademark Office*